US010099903B2

(12) United States Patent
Schwarzhans

(10) Patent No.: US 10,099,903 B2
(45) Date of Patent: Oct. 16, 2018

(54) METHOD FOR CONTROLLING THE FILL VOLUME OF A GRAPPLE

(71) Applicant: Liebherr-Werk Nenzing GmbH, Nenzing (AT)

(72) Inventor: Andreas Schwarzhans, Schruns (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 492 days.

(21) Appl. No.: 14/552,223

(22) Filed: Nov. 24, 2014

(65) Prior Publication Data

US 2015/0148962 A1 May 28, 2015

(30) Foreign Application Priority Data

Nov. 25, 2013 (DE) ........................ 10 2013 019 761

(51) Int. Cl.
*G06F 19/00* (2018.01)
*B66C 13/18* (2006.01)
*B66C 13/16* (2006.01)

(52) U.S. Cl.
CPC .............. *B66C 13/18* (2013.01); *B66C 13/16* (2013.01)

(58) Field of Classification Search
USPC ................................ 700/275; 212/81, 83–84
See application file for complete search history.

(56) References Cited

U.S. PATENT DOCUMENTS 3,596,973 A * 8/1971 Anderson ............... B66C 1/585 294/110.1
3,863,772 A * 2/1975 Schwartz ................ B66C 13/46 212/281
4,079,844 A * 3/1978 Whitaker ............... B65G 47/90 221/11
4,552,349 A * 11/1985 Loos ....................... B07C 3/085 198/349
4,579,380 A * 4/1986 Zaremsky .............. B25J 13/082 294/119.1
4,749,328 A * 6/1988 Lanigan, Jr. ............ B66C 1/223 212/326
4,761,107 A * 8/1988 Frantti ................... G21C 19/32 376/264
5,392,935 A * 2/1995 Kazama ................ B66C 13/063 212/276

(Continued)

FOREIGN PATENT DOCUMENTS

| | | | |
|---|---|---|---|
| DE | 244962 | A1 | 4/1987 |
| DE | 102009011604 | A1 | 9/2010 |
| EP | 2226287 | A1 | 9/2010 |

OTHER PUBLICATIONS

Sneckenberger et al. , Integration of a Computerzed Two-Fingerr Gripper for Robot Workstation Safety, 1986, West Virginia University, p. 335-338.*

*Primary Examiner* — Kidest Bahta
(74) *Attorney, Agent, or Firm* — McCoy Russell LLP

(57) ABSTRACT

A method for controlling the fill volume of a grapple, such as a bulk-material crane grapple which includes at least one hoist-and-closure unit, may include adjusting the fill volume of the grapple is during the grapple closure process by adjusting/controlling the grapple hoist height. The grapple hoist speed and/or grapple hoist height may be the controlling parameter for the adjustment of the fill volume of the grapple.

14 Claims, 4 Drawing Sheets

(56) References Cited

U.S. PATENT DOCUMENTS

| | | | | | |
|---|---|---|---|---|---|
| 5,871,248 | A * | 2/1999 | Okogbaa | B25J 15/00 | 294/86.4 |
| 6,023,862 | A * | 2/2000 | Sirjola | B66C 3/125 | 212/320 |
| 6,047,037 | A * | 4/2000 | Wivagg | G21C 19/10 | 376/260 |
| 6,081,292 | A * | 6/2000 | Lanigan, Jr. | B66C 13/46 | 114/264 |
| 6,241,462 | B1 * | 6/2001 | Wannasuphoprasit | B66D 3/18 | 212/283 |
| 6,256,553 | B1 * | 7/2001 | Erikkila | B66C 13/063 | 212/284 |
| 6,653,804 | B1 * | 11/2003 | Kureck | B66C 3/125 | 318/3 |
| 2004/0191026 | A1 * | 9/2004 | Raitanen | B66C 1/422 | 414/172 |
| 2006/0102578 | A1 * | 5/2006 | Zakula, Sr. | B66C 13/22 | 212/283 |
| 2007/0110553 | A1 * | 5/2007 | Neal | B66F 9/184 | 414/741 |
| 2011/0089388 | A1 * | 4/2011 | Kiova | B66C 13/04 | 254/267 |
| 2014/0333232 | A1 * | 11/2014 | Verheyen | B66C 13/38 | 318/5 |

* cited by examiner

METHOD FOR CONTROLLING THE FILL VOLUME OF A GRAPPLE

CROSS REFERENCE TO RELATED APPLICATION

This application claims priority to German Patent Application No. 10 2013 019 761.9, entitled "Method for Controlling the Fill Volume of a Grapple," filed Nov. 25, 2013, which is hereby incorporated by reference in its entirety for all purposes.

TECHNICAL FIELD

The present disclosure concerns a method for controlling the fill volume of a grapple.

BACKGROUND

Methods for controlling the fill volume of crane grapples are known. In such methods, adjustment/control electronics interact in a crane's movement cycle to optimize the movement cycle with respect to specified parameters. For example, via interaction of adjustment/control electronics in the movement cycle, an increase in travel and thereby the best possible utilization of the crane will be achieved during its operation.

Methods are also known which, by corresponding interactions in the crane's movement cycle, will achieve protection of the crane by avoiding overloading of the crane. Here, the static equilibrium of the crane in particular is protected with regard to adjustment/control engineering, in which taking up too great a load is at first detected and then prevented. Also, such methods may be used in operator-assisted systems, in which, depending on the method, simplification of crane handling will be achieved, for instance.

At the same time, it is problematic that many influencing factors determine the degree to which the grapple is filled. These factors may include both the angle of grapple entry into the material to be loaded and the compactness of the material, which can vary by more than 20% within a load on a ship to be unloaded, for example. The grapple geometry, or the oblique traction operating on the grapple, may also play a role. Because overloading the grapple can lead to crane damage, the crane controller or operator prefers to partially fill the grapple clearly less than is in fact allowed or would be possible.

The task of the present disclosure is therefore to make a method available for controlling the fill volume of a grapple, by means of which improved filling of the grapple is achieved.

This problem is solved according to the present disclosure by a method for controlling the fill volume of a grapple, in particular a bulk-material grapple of a crane, wherein the grapple includes at least one hoist-and-closure unit and wherein the fill volume of the grapple is adjusted during the process of closing the grapple by adjusting/controlling the grapple hoist height, in which the grapple hoist speed and/or the grapple hoist height is the controlling parameter.

In this way, it is possible for the controller or operator to predetermine the closure speed of the grapple, and the system, being based on a model, optimizes the required hoist height of the grapple during the closure process, with the effect that the desired degree of fill is achieved.

The process of filling the grapple is thereby partially automated, which makes it easier for the controller to achieve optimized grapple-fill status without the fill process being beyond the ultimate control of the controller. Possible overloading of the crane structure is therewith concomitantly reduced and is avoided in the optimum case. Also, any possible negative effect of the operator on the fill volume is minimized. Consequently, less experienced operators can clearly increase the travel, or conversely the energy expended by the operator can generally be clearly reduced.

To carry out the method according to the present disclosure, an adjustment/control device is coupled to the crane or can be provided on the crane in the conventional manner, said device being designed for this purpose to record sensor input or sensor values, to process, and to emit an adjustment/control signal on the crane or crane unit.

In one embodiment, it is conceivable that, depending on the sensor values measured, a necessary temporary change in the grapple hoist height is continuously determined using a model, in order to achieve the target load to be lifted by the crane.

At the same time, the model can advantageously react dynamically to changing parameters in a crane-assembly run, such as, for example, changing material compactness in the material to be loaded or other changing parameters, and they are optimized in reference to the crane or to existing requirements. Consequently a self-teaching system is made available, which can adjust dynamically to different situations.

In another embodiment, it is conceivable that additionally or alternatively, depending on the grapple closure speed, a necessary temporary change in the grapple hoist height is continuously determined using a model, in order to achieve the target load to be lifted by the crane.

The method can thus use as an input parameter, for example, the grapple closure speed defined or definable by a controller as an input parameter and, depending on the grapple closure speed, can adjust grapple hoist speed so that the required or desired target load of the grapple is achieved during the grapple-fill process. The model used can at the same time be designed so that it has recourse to both the grapple closure speed and further sensor values.

In another embodiment, it is conceivable that the grapple closure speed can be controlled by the control crew of the crane. It is thereby advantageously made possible for the control crew or controller of the crane to supply the input grapple closure speed for the method according to the present disclosure, through corresponding control signals or input values, input by said personnel by means of an input console, for example.

In another embodiment, it is conceivable that during the operation of the crane, parameters of the model are continuously optimized, depending on deviation from the target, in which said target deviation is the deviation between the target load to be lifted and the load actually being lifted.

As a result, the method automatically examines the effectiveness of its model and can accordingly adjust the parameters of the model in running operation so that deviation between the load actually being lifted and the desired or specified target load is minimized.

In a further embodiment, it is conceivable that further sensor inputs or sensor values are recorded by means of the model, such as the weight of the grapple and/or the angle of entry into the material and/or the depth of material penetration.

Because of this, it advantageously makes it possible to increase the precision of the model and therewith the effectiveness of crane operation. In principle, however, additional sensors are not required, and the method, in contrast to existing cranes, can be used with the sensors provided on said crane in the conventional manner.

Further details and advantages of the present disclosure are now explained using the figures.

DETAILED DESCRIPTION

Figure 1:
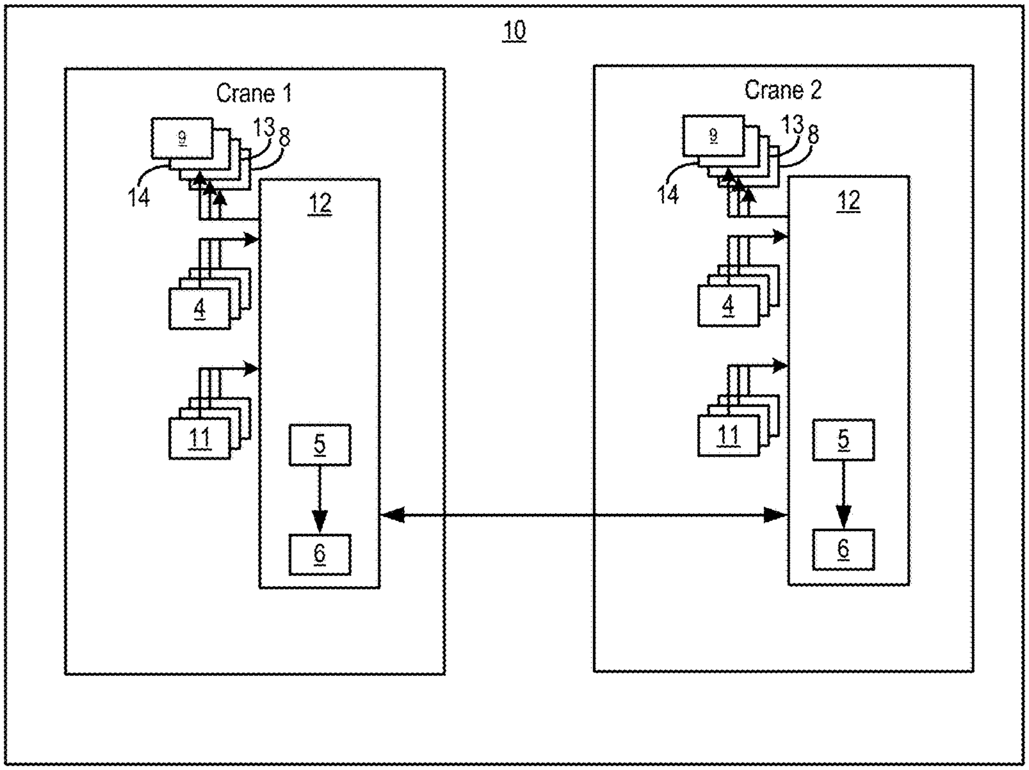
FIG. 1 shows a schematic diagram of a crane system.
Figure 2:
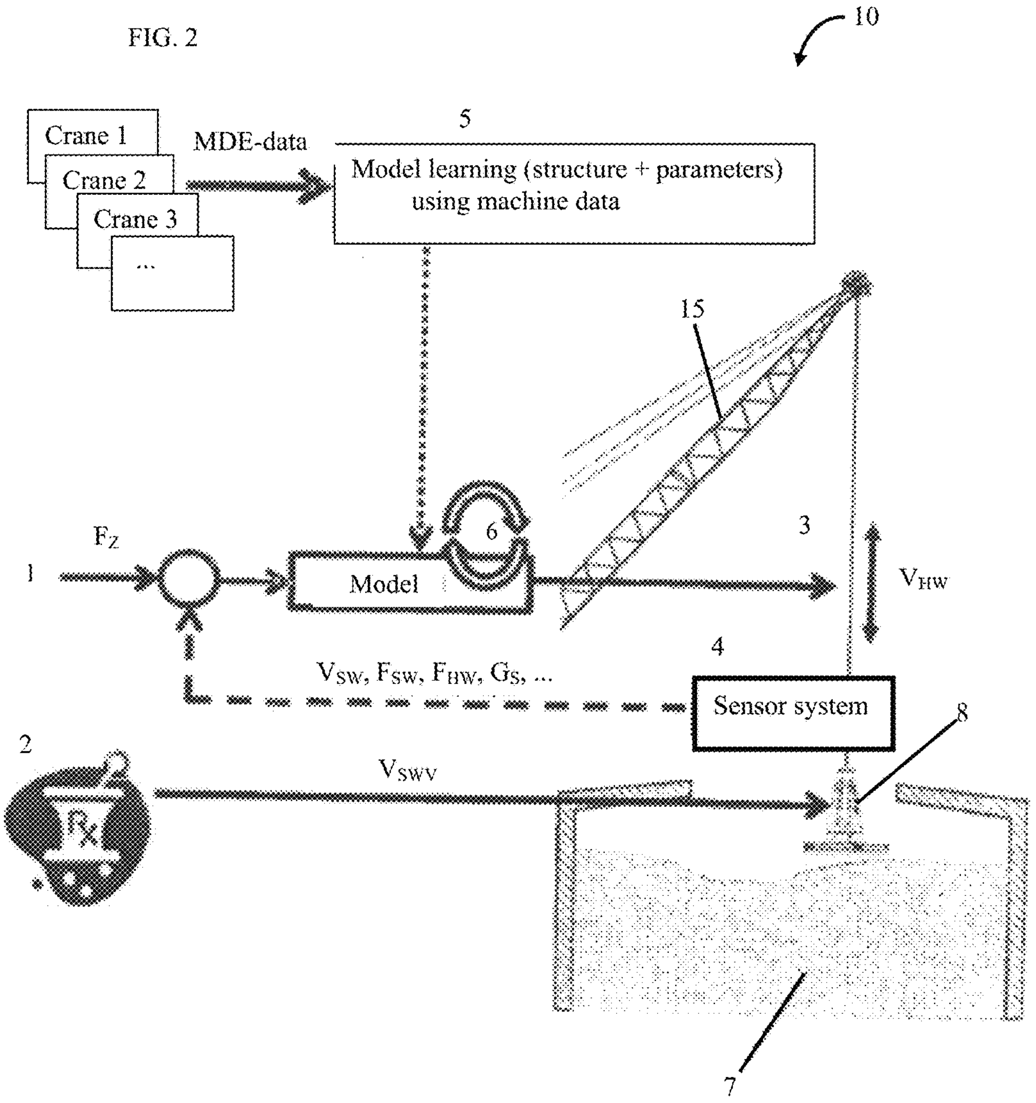
FIG. 2 shows a further schematic diagram of the crane system of FIG. 1.

As shown in FIG. 1, a crane system 10 may include one or more cranes. While two cranes are depicted in crane system 10 of FIG. 1, any number of cranes may be included in crane system 10 without departing from the scope of this disclosure (e.g., three cranes as depicted in FIG. 2, or a single crane). As shown, each crane may be controlled via a respective adjustment/control device 12. Adjustment/control device 12 may be configured as a microcomputer including a microprocessor unit, input/output ports, an electronic storage medium for executable programs and calibration values, random access memory, keep alive memory, and a data bus, for example. Adjustment/control device 12 may receive various signals from sensors 4. Further, adjustment/control device 12 may monitor and adjust the position of various actuators 9 based on input received from the various sensors 4. These actuators may include, for example, an actuator for a shovel or grapple 8, an actuator for a holding unit 13, an actuator for a closure unit 14, etc. Holding unit 13 and closure unit 14 may be separate control units, or alternatively, holding unit 13 and closing unit 14 may be combined as a single unit (e.g., a hoist-and-closure unit of the grapple). Storage medium read-only memory in adjustment/control device 12 can be programmed with computer readable data representing instructions executable by a processor for performing the methods described below, as well as other variants that are anticipated but not specifically listed.

As shown, adjustment/control device 12 may also receive manual input from one or more members of a crane crew or a crane operator via one or more input means 11, which may include an input console, joystick, etc.

Each adjustment/control device 12 may store a mathematical model 5 in memory, which may be updated based on various inputs to the adjustment/control device. As described below, model 5 may be taught statistically from several available real data sets, and may be used as a basis for crane control. In addition, each adjustment/control device 12 may store an optimized model 6, which may be a modified version of model 5 which has been optimized based on current operating parameter values of the crane(s) in the crane system as well as based on other relevant parameter values such as the material properties of the material being handled by the grapple.

As shown, the adjustment/control devices for the cranes in the crane system may be in communication, such that the models and optimized models may be updated based on applicable parameters from data recordings of the other cranes in the crane system.

Turning to FIG. 2, it provides another schematic representation of crane system 10.

As may be inferred from the block diagram of FIG. 2, a target load $F_Z$ for a crane may be predetermined according to the methods described herein in a first workstep. The predetermined target load $F_Z$ can thereby automatically result due to adjustment/control of the crane. For example, the target load $F_Z$ may be determined by the adjustment/control device based on the crane's offloading-related maximum-load table. The target load $F_Z$ can also result from manual input, in which the desired target load $F_Z$ is entered by a crane operator, for instance.

After the crane operator has directed the shovel or grapple 8 into the bulk material 7, the crane operator begins to close the grapple 8. The adjustment/control device detects the beginning of the grappling process at the same time, e.g. based on the increasing grapple-closure force of grapple 8. From this point in time, the crane operator, by means of a control element, such as a joystick, for example, henceforth controls the closure process of grapple 8 based on a desired closure speed of grapple 8 ($V_{SWV}$) in work step 2.

From the sensor values available, such as, for instance, the actual grapple closure speed $V_{SW}$, the force in the closure unit $F_{SW}$, the force in the holding unit $F_{HW}$ or the degree of grapple closure $G_S$, and the predetermined target load $F_Z$ in view, model 5 continuously calculates, throughout the entire closure process, the temporary change in the height of the holding unit in work step 3. A speed for the holding unit 13, $V_{HW}$, is hereby output by the adjustment/control device, so that the guideline (e.g., the desired grapple closure speed) is achieved in the course of the grappling process by lifting and/or lowering grapple 8, or the fill volume is optimized. In this way, the crane operator may maintain control at all times by means of the guideline for grapple-closure speed, $V_{SW}$. The crane operator may also shut down further opening or closing of the grapple and cause superimposed movements of the holding unit at any time, and they will be corrected by means of the model. Any device that serves to stop and move grapple 8 can be designated here as the holding unit 13.

The arrangement shown can be expanded by means of any system of sensors 4 that is in a position to describe the grappling process more precisely. This can, for instance, result by detecting the entry angle of grapple 8 into the material 7, using the orientation of the holding unit relative to the crane boom 15. But data from sensors provided in the conventional manner on a crane can also be used in the method.

The model 5 used for adjustment/control according to the methods described herein involves a mathematical model taught statistically from several available real data sets, which depicts the relationship between available sensor data and the interaction necessary with respect to the hoist height of the grapple, considering the grapple-fill ultimately achieved in the complete grapple-closure process. As shown in FIG. 2, the basis for learning or plotting the model structure of model 5 and the applicable parameters from data recordings on several cranes (Crane 1, Crane 2, Crane 3) is formed with a corresponding system of sensors.

In order to obtain optimal results in the application, the parameters of model 5 are continuously optimized during material travel using the target deviations, and they are adjusted to the existing real situation. As a result, optimized model 6 is obtained for the actual material with regard to its compactness, compression, or grain-size and with regard to the actual conditions prevailing, such as, for instance, the type of grapple used or the depth of material penetration. This makes it possible for model 6 to adaptively adjust to changing prevailing conditions during crane operation and, for example, to compensate for material compactness increasing due to compression as the penetration depth of grapple 8 increases. It is therewith possible to constantly work with optimal models and thus ensure optimal grapple filling.

In contrast to methods in which the torque is adjusted, the present disclosure makes it possible, by adjusting the speed of the grapple or of the holding unit, to achieve a distinct increase in quality when adjusting/controlling grapple filling. According to the present disclosure, it is in fact also possible to optimize grapple closure under changing prevailing conditions, such as, for example, changing material compactness, entry angle, or penetration depth.

Figure 3:
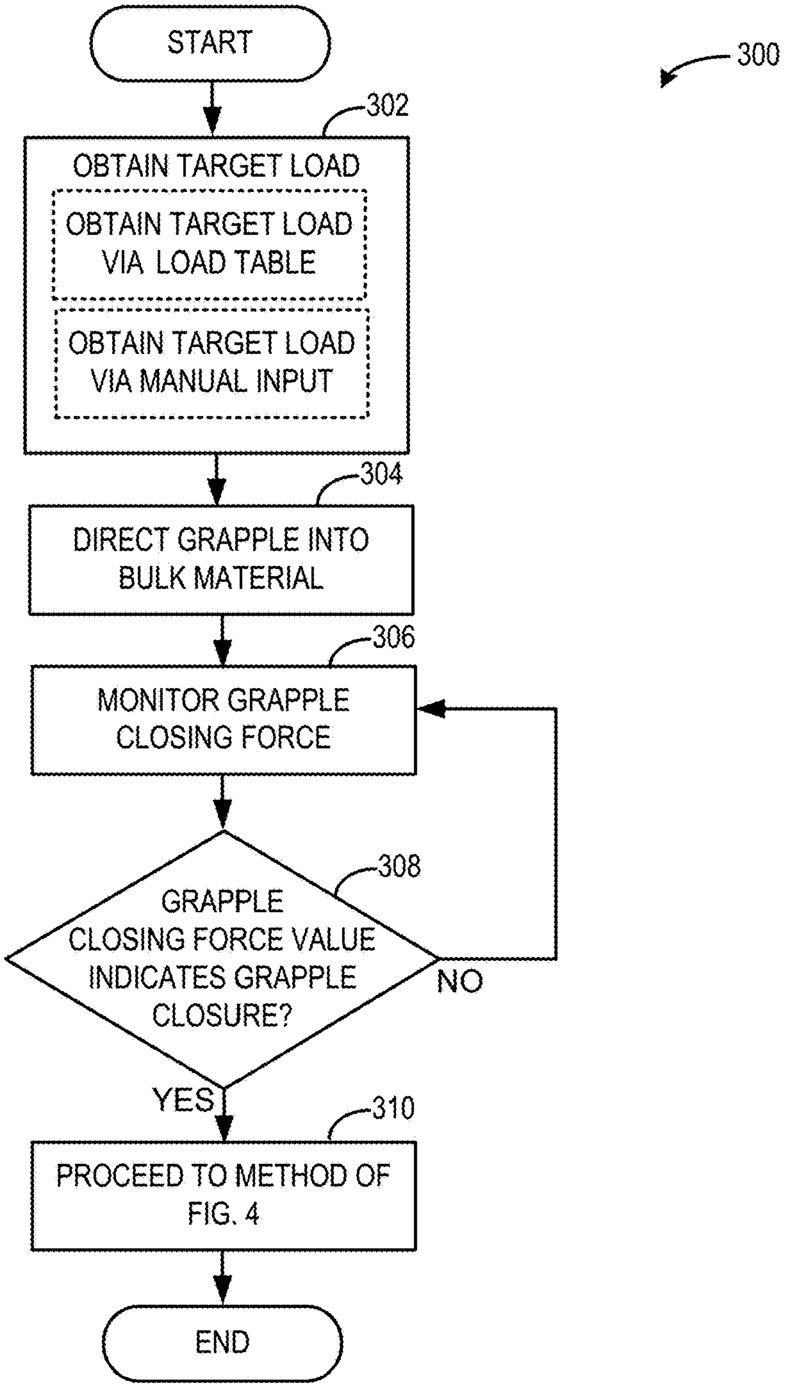
FIG. 3 shows an example method for controlling a grapple, which may be performed in conjunction with the method of FIG. 4.

Turning to FIG. 3, it shows an exemplary method 300 for controlling a grapple such as grapple 8 of FIGS. 1-2. Method 300 may be performed in conjunction with the method of FIG. 4, which will be described below.

At 302, method 300 includes obtaining a target load (e.g., target load $F_Z$ described above). The target load may be a target load to be carried by the grapple. In one example, the target load may be obtained using a load table stored in memory of adjustment/control device 12. In another example, the target load may be obtained via manual input (e.g., input from a crane operator or member of a crane crew via an input means).

After 302, method 300 proceeds to 304 to direct the grapple into bulk material (e.g., bulk material 7 shown in FIG. 2). For example, adjustment/control device 12 may send a signals to various actuators (e.g., an actuator of holding unit 13) which control the position of the grapple to accomplish this action.

After 304, method 300 proceeds to 306 to monitor a closing force of the grapple. For example, this may include sensing the closing force with one or more sensors 4, and/or monitoring parameter values in adjustment/control device which are indicative of the closing force of the grapple.

After 306, method 300 proceeds to 308 to determine whether the grapple closing force indicates grapple closure. For example, this may include checking a flag in adjustment/control device which is set when parameter value(s) indicate that grapple closure is in progress or has begun, or applying control logic to various sensed values/stored parameter values. If the answer at 308 is YES, method 300 proceeds to 310 to perform the method of FIG. 4, which will be described below. After 310, method 300 ends. Otherwise, if the answer at 308 is NO, method 300 returns to 306 to continue monitoring grapple closing force.

Figure 4:
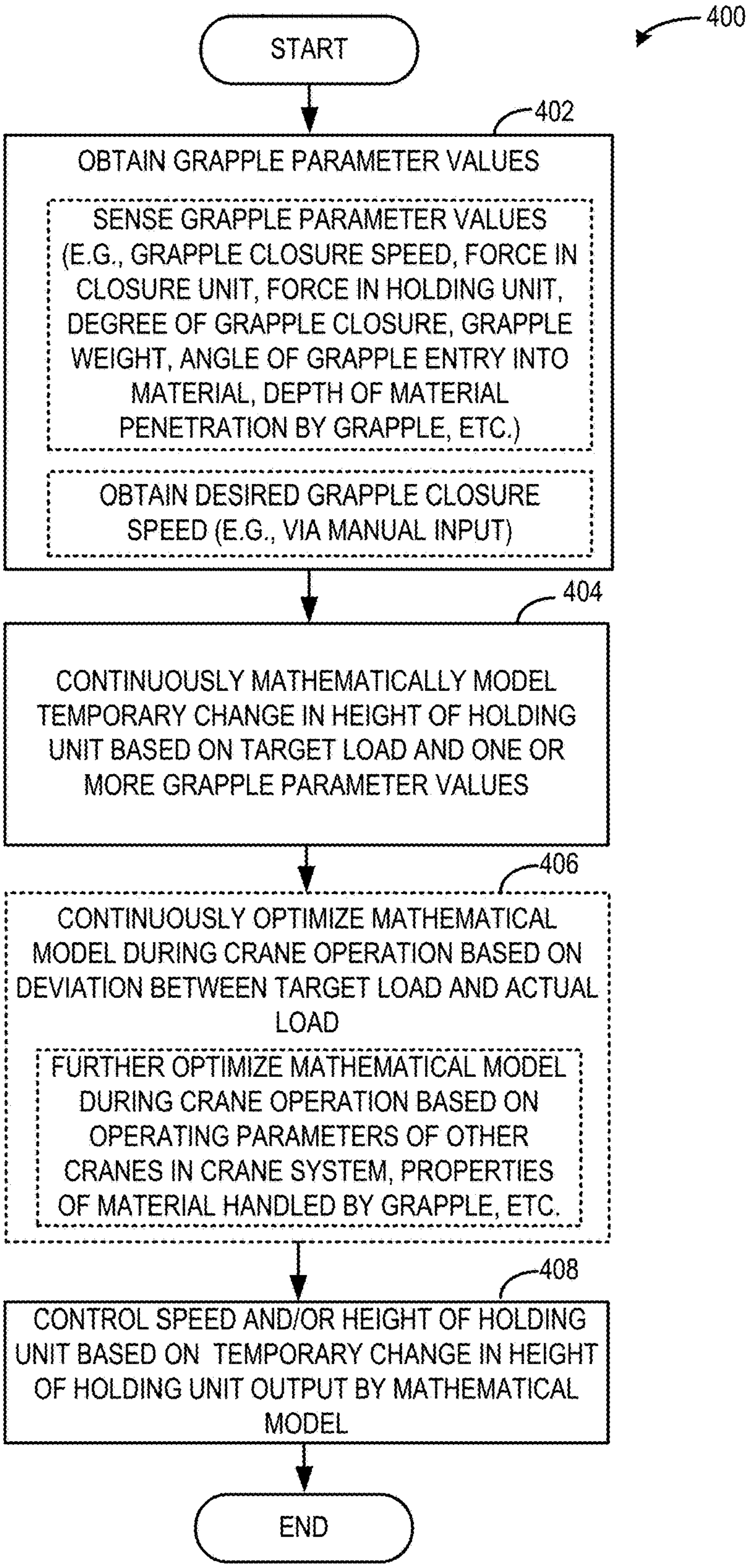
FIG. 4 shows an example method for controlling a grapple, which may be performed in conjunction with the method of FIG. 3.

FIG. 4 shows a further exemplary method for exemplary method 400 for controlling a grapple such as grapple 8 of FIGS. 1-2. Method 400 may be performed at step 310 of method 300 of FIG. 3, for example.

At 402, method 400 includes obtaining grapple parameter values. This may optionally include sensing grapple parameter values via various sensors 4, such as actual grapple closure speed $V_{SW}$, force in a closure unit of the grapple $F_{SW}$, force in the holding unit of the grapple $F_{HW}$, degree of grapple closure $G_S$, grapple weight, angle of grapple entry into bulk material, depth of material penetration by grapple, etc. Obtaining grapple parameter values may further optionally include obtaining a desired grapple closure speed. In one example, the desired grapple closure may be obtained via manual input from a member of a crane crew or a crane operator. In another example, the desired grapple closure speed may be determined by the adjustment/control device based on stored values, manual input, and/or sensed parameter values using control logic.

After 402, method 400 proceeds to 404. At 404, the method includes continuously mathematically modeling a temporary change in height of the holding unit of the grapple based on a target load (e.g., the target load obtained at step 302 of method 300) and further based on one or more grapple parameter values (e.g., the grapple parameter values obtained at 402). The continuous mathematical modeling may be performed by a processing unit of adjustment/control device, as represented by model 5 shown in FIG. 1.

After 404, method 400 may optionally proceed to 406. At 406, the method includes continuously optimizing the mathematical model during crane operation based on a deviation between the target load (e.g., target load $F_Z$ obtained at step 302 of method 300) and an actual load (e.g., an actual load carried by the grapple as determined by adjustment/control device 12 based on signals from one or more sensors 4). While step 406 is shown as being performed after step 404, it will be appreciated that step 406 may be performed continuously during crane operation in some examples. An optimized version of the mathematical model which may be produced at step 406 is represented by optimized model 6 shown in FIG. 1.

At 406, method 400 may also optionally include further optimizing the mathematical model during crane operation based on changing parameter values in a crane-assembly run. The changing parameter values may include values of, for example, operating parameters of other crane(s) in the crane system, and parameters of the material being handled by the grapple such as compactness.

After 406 (or after 404 if optional step 406 is not performed), method 400 proceeds to 408 to control a speed and/or height of the grapple holding unit based on the temporary change in height of the holding unit (e.g., the temporary change in the holding unit height modeled via model 5 or optimized model 6). After 408, method 400 ends.

In accordance with FIGS. 3 and 4, a method for a crane system may comprise obtaining a target load for a crane, wherein the crane is one of a plurality of cranes of the crane system. The method may further comprise, during closure of a grapple of the crane, controlling a speed and height of a grapple hoist-and-closure unit via a mathematical model based on parameter values of the grapple and the target load. In addition, the method may include continuously optimizing the mathematical model during crane operation based on a deviation between the target load and an actual load of the crane and/or based on operating parameters of one or more of the other cranes of the crane system and/or based on parameter values of a material handled by the grapple. In some examples, the parameter values of the material handled by the grapple may comprise one or more of a compactness, a compression, and a grain size of the material. The target load may be obtained via manual input by a crane operator, in one example.

Further, in accordance with FIGS. 1-4, a crane system may comprise one or more cranes, each crane comprising a grapple, a grapple holding unit, and an adjustment/control device. The adjustment/control device may include non-transient, computer-readable medium including instructions which, when executed by a processor, continuously mathematically model a desired temporary change in height of the grapple holding unit based on a target crane load and sensed grapple parameter values and control a speed and/or height of the grapple holding unit based on the desired temporary change in height. The instructions may further include instructions to optimize the mathematical modeling of the desired temporary change in height of the grapple holding unit based on current operating parameter values of the crane(s) in the crane system, and/or instructions to optimize the mathematical modeling of the desired temporary change in height of the grapple holding unit based on material properties of the material being handled by the grapple. In one example, the crane system may comprises a plurality of cranes, wherein the adjustment/control devices of the cranes in the crane system are in communication, and wherein a mathematical model stored in the adjustment/control device of each crane is continuously updated based on applicable parameters from data recordings of the other cranes in the crane system.

Note that the specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a fill volume of a grapple of a crane, wherein the grapple includes at least one hoist-and-closure unit, comprising:

with a processor, executing instructions stored in a non-transient, computer-readable medium of an adjustment/control device to adjust, in real-time, the fill volume of the grapple while closing the grapple by adjusting a grapple hoist height, wherein the instructions further comprise instructions to sense grapple parameter values with one or more sensors and, depending on the sensed grapple parameter values, continuously determine a temporary change in the grapple hoist height using a mathematical model, in order to achieve a target load to be lifted by the crane;

wherein at least one of the grapple parameter values are of a material being handled by the grapple; and wherein the at least one of the grapple parameter values of a material being handled by the grapple are a compactness, a compression, or a grain size of the material.

2. The method according to claim 1, wherein the instructions further comprise instructions to, depending on grapple closure speed, continuously determine the temporary change in the grapple hoist height using the mathematical model, in order to achieve the target load to be lifted by the crane.

3. The method according to claim 2, wherein the grapple closure speed is controlled by a control crew of the crane.

4. The method according to claim 1, wherein the instructions further comprise instructions to, during crane operation, continuously optimize parameters of the mathematical model based on a deviation between the target load to be lifted by the crane and a load actually lifted by the crane.

5. The method according to claim 1, wherein the instructions further comprise instructions to record the grapple parameter values sensed by the one or more sensors by means of the mathematical model, wherein the grapple parameter values sensed by the one or more sensors comprise grapple weight and/or an entry angle of the grapple into a material and/or a depth of material penetration by the grapple.

6. A crane system, comprising:

a plurality of cranes, each crane comprising a grapple, a grapple holding unit, and an adjustment/control device, the adjustment/control device including a non-transient, computer-readable medium including instructions which, when executed by a processor:

sense real-time grapple parameter values with one or more sensors, wherein the grapple parameter values comprise at least one characteristic of a material handled by the grapple and at least one of weight of the grapple, depth of material penetration of the material being handled, actual grapple closure speed, force of closure, and degree of grapple closure;

continuously mathematically model a temporary change in height of the grapple holding unit based on a target crane load and the sensed real-time grapple parameter values; and control a speed and/or the height of the grapple holding unit while closing the grapple based on the temporary change in height, wherein the adjustment/control devices of the cranes in the crane system are in communication, and wherein a mathematical model stored in the adjustment/control device of each crane is continuously updated based on applicable parameters from data recordings of the other cranes in the crane system.

7. The system of claim 6, wherein the instructions further include instructions to optimize the mathematical modeling of the temporary change in height of the grapple holding unit based on current operating parameter values of the crane(s) in the crane system.

8. The system of claim 6, wherein the instructions further include instructions to optimize the mathematical modeling of the temporary change in height of the grapple holding unit based on material properties of the material being handled by the grapple.

9. A method for a crane system, comprising, with a processor, executing instructions stored in a non-transient, computer-readable medium of an adjustment/control device to:

obtain a target load for a crane, wherein the crane is one of a plurality of cranes of the crane system; and during closure of a grapple of the crane, control a speed and height of a grapple hoist-and-closure unit via a mathematical model stored in the computer-readable medium based on real-time parameter values of the grapple and the target load;

wherein the parameter values comprise at least one characteristic of a bulk material being handled by the grapple and at least one of weight of the grapple, depth of material penetration of the bulk material being handled, actual grapple closure speed, force of closure, and degree of grapple closure.

10. The method of claim 9, wherein the instructions further comprise instructions to continuously optimize the mathematical model during crane operation based on a deviation between the target load and an actual load of the crane.

11. The method of claim 10, wherein the instructions further comprise instructions to continuously optimize the mathematical model during crane operation based on operating parameters of one or more of the other cranes of the crane system.

12. The method of claim 9, wherein the parameter values of the material handled by the grapple comprise one or more of a compactness, a compression, and a grain size of the material.

13. The method of claim 9, wherein the target load is obtained via manual input by a crane operator.

14. The system of claim 6, wherein each grapple is a bulk-material grapple, and wherein the sensed real-time grapple parameter values comprise one or more of an angle of grapple entry into a bulk material, a depth of penetration of the grapple into the bulk material, a compactness of the bulk material, a compression of the bulk material, and a grain-size of the bulk material.

* * * * *